Figure 1:
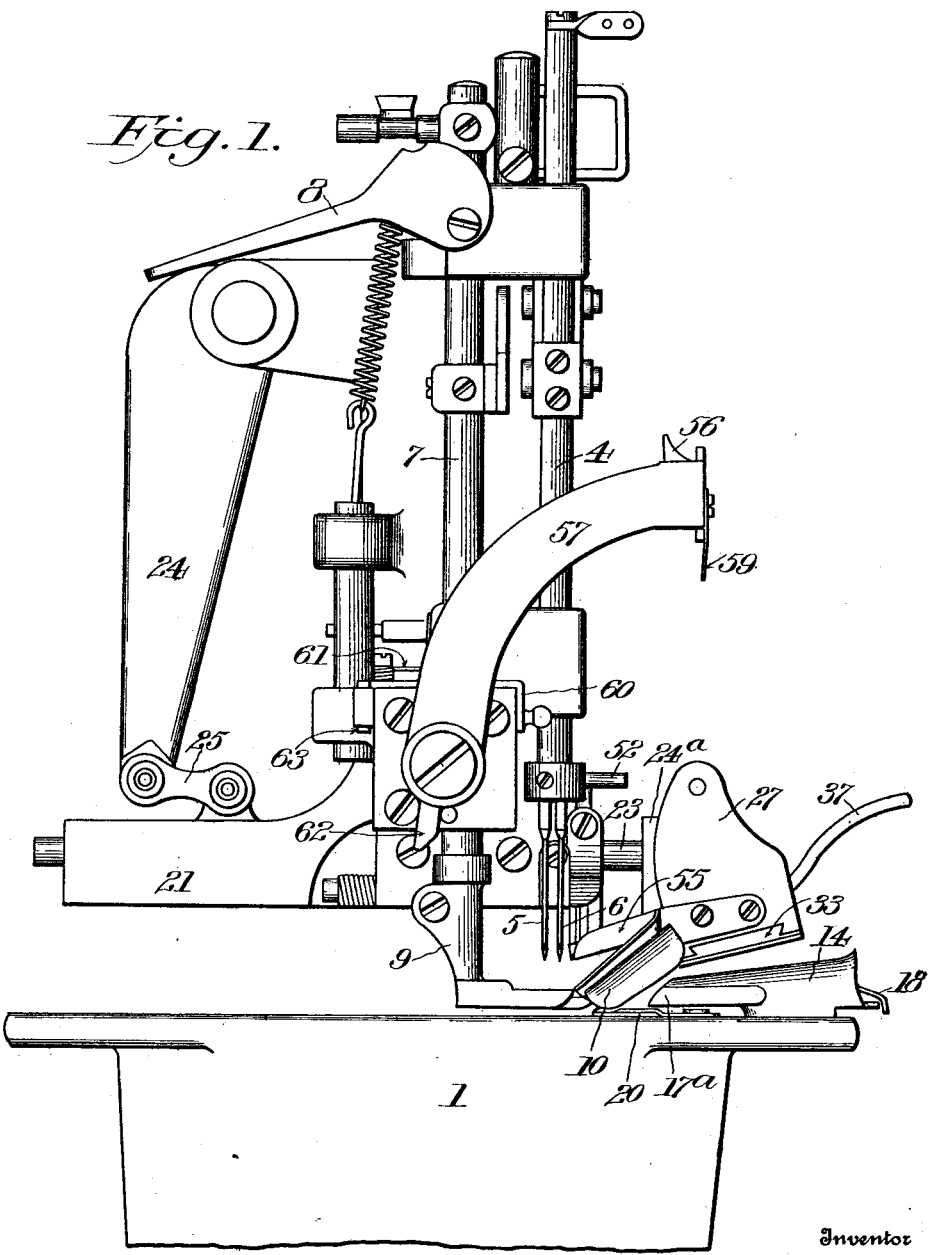

J. R. MOFFATT.
SEWING MACHINE.
APPLICATION FILED JULY 9, 1909.

1,141,476.

Patented June 1, 1915.
5 SHEETS—SHEET 3.

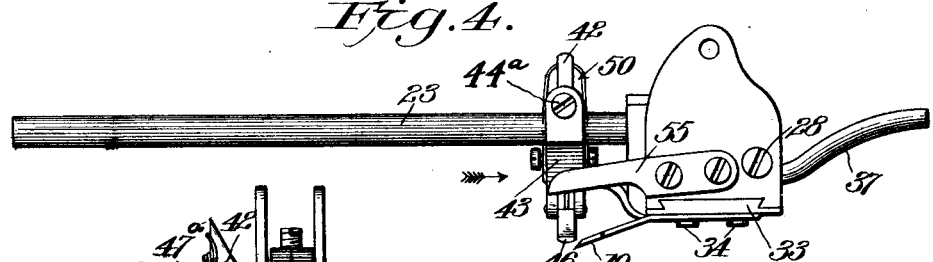
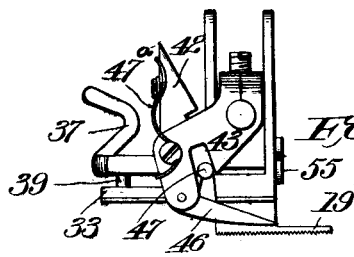
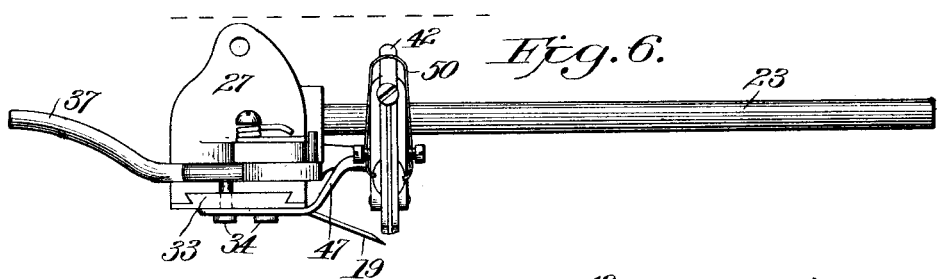
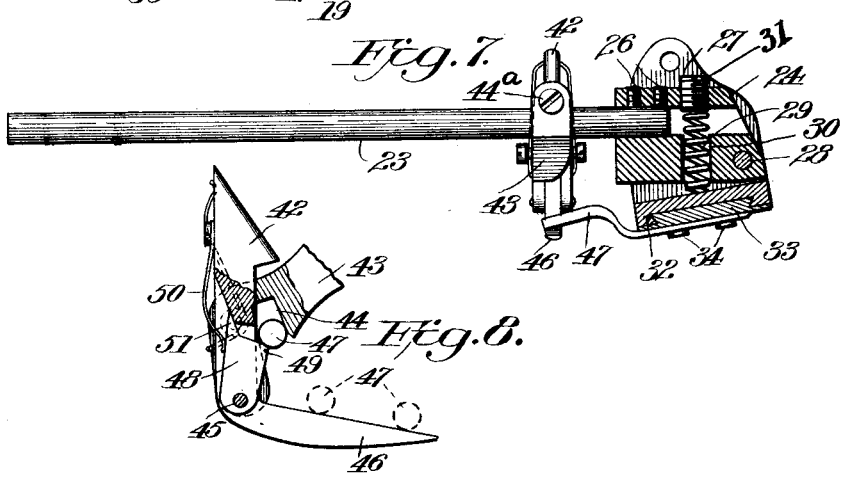
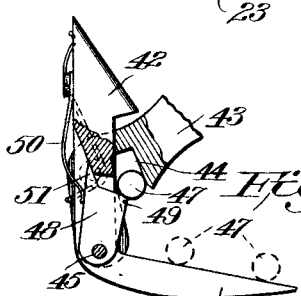

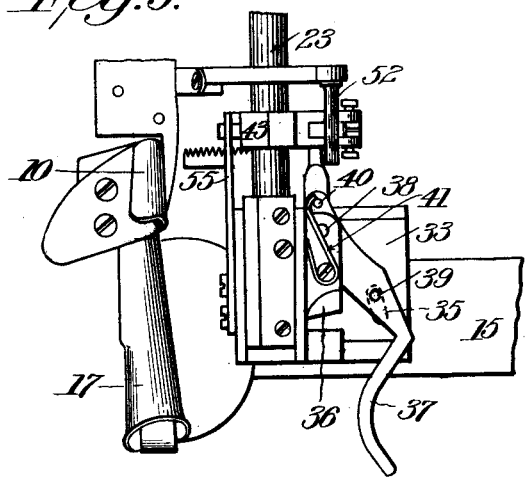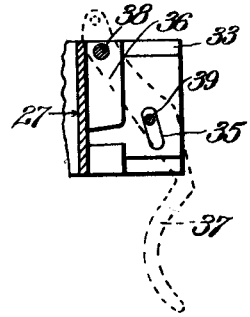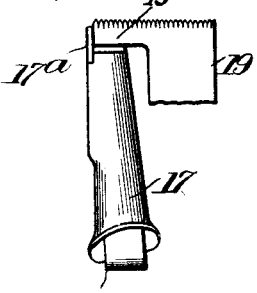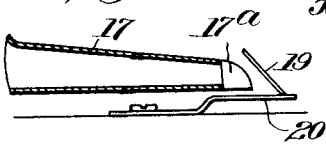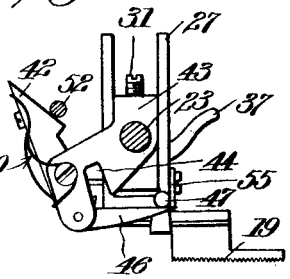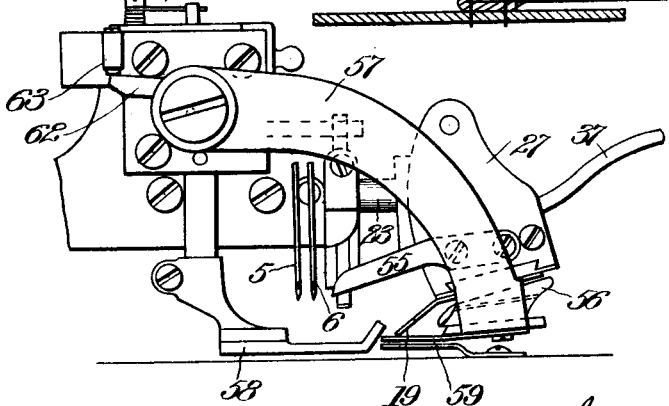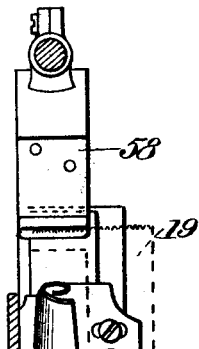

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEWING-MACHINE.

1,141,476.  Specification of Letters Patent.  Patented June 1, 1915.

Application filed July 9, 1909.  Serial No. 506,805.

*To all whom it may concern:*

Be it known that I, JAMES R. MOFFATT, a citizen of the United States, residing at Chicago, in the county of Cook, State of Illinois, have invented certain new and useful Improvements in Sewing-Machines, of which the following is a description, reference being had to the accompanying drawing and to the letters and figures of reference marked thereon.

The invention relates to new and useful improvements in sewing machines, and more especially sewing machines which are provided with a ruffling mechanism.

An object of the invention is to provide a sewing machine with a ruffling mechanism which may be quickly moved out of its operative position where the same is rendered ineffective to ruffle the material.

A further object of the invention is to provide a ruffling mechanism which is capable of being moved out of its operative relation to the stitching mechanism, with a latch for holding the ruffling mechanism in inoperative position, together with means for automatically returning the ruffling mechanism to its operative position relative to the stitching mechanism, when said latch is released.

A further object of the invention is to provide a sewing machine which has an overhanging arm, with suitable folders, and with a ruffling mechanism which may be moved in a direction underneath the arm, when it is desired to render the ruffling mechanism inoperative.

These and other objects will in part be obvious, and will in part be hereinafter more fully described.

In the drawings which show by way of illustration one embodiment of the invention,—

Figure 2:
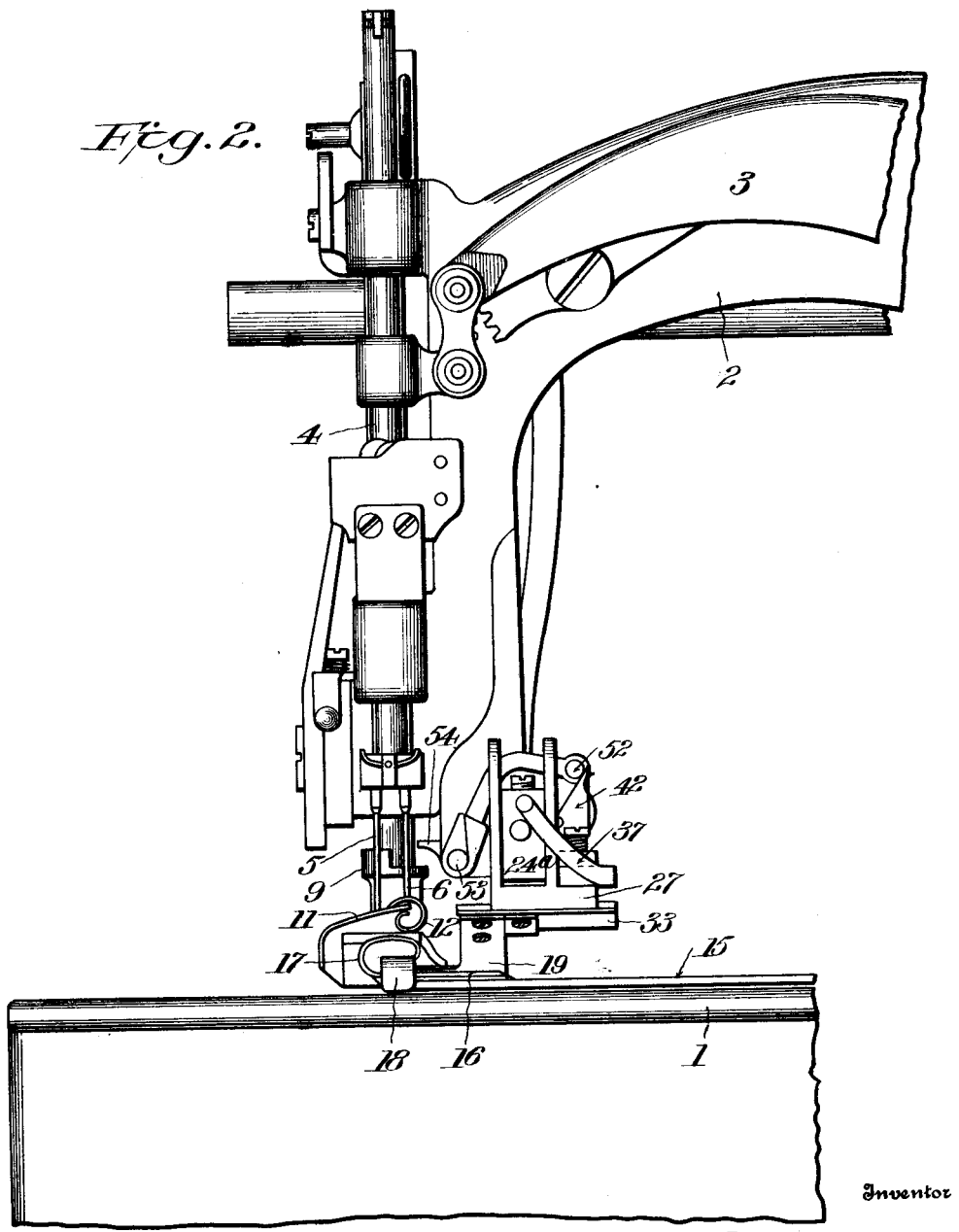
Figure 3:
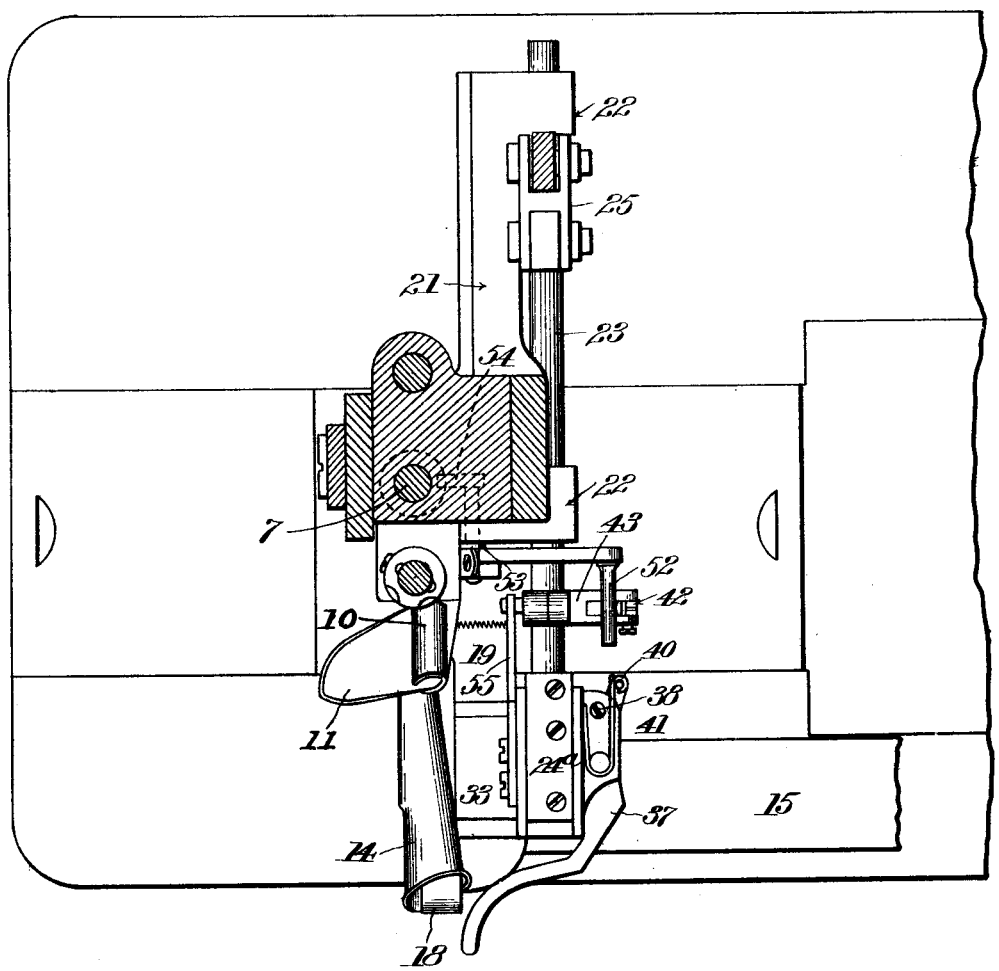

Figure 1 is an end view of the sewing machine with my improved mechanism applied thereto; Fig. 2 is a side view of the front end of a sewing machine with the invention applied thereto; Fig. 3 is a top plan view of the ruffling mechanism, showing the head of the machine in section; Fig. 4 is a detail of the ruffling mechanism detached from the machine, and the ruffling blade in inoperative position; Fig. 5 is a similar view taken in the direction of the arrow, Fig. 4; Fig. 6 is a similar view from the other side of the ruffling mechanism; Fig. 7 is a sectional view through the supporting block for the ruffling head; Fig. 8 is a detail, showing the locking latch for holding the ruffling mechanism in inoperative position; Fig. 9 is a top plan view of the ruffling mechanism and the folders, showing the ruffling mechanism in inoperative position; Fig. 10 is a detail, showing the lever for moving the ruffling blade to inoperative position; Fig. 11 is a view similar to Fig. 5, showing the locking latch released and the ruffling blade moved laterally to its operative position; Fig. 12 is a detail sectional view, showing the position of the ruffler blade relative to the lower folder; Fig. 13 is a detail top plan of the same; Fig. 14 is a sectional view, showing a ruffle attached to a body fabric by my ruffling mechanism; Fig. 15 is an end view of a machine showing a modified form of presser foot, and a different folder coöperating with the ruffler; Fig. 16 is a plan view of the presser foot and folder, shown in Fig. 15; and Fig. 17 is a sectional view showing a flounce attached to a body fabric by the ruffling mechanism shown in Figs. 15 and 16.

The work support 1, the overhanging arm 2, the needle lever 3 and the needle bar 4, which is reciprocated by the needle lever, are of the usual construction.

At the lower end of the needle bar, I have shown two needles 5 and 6. In place of the two needle mechanism herein shown, it is obvious that any other suitable stitch-forming mechanism may be substituted therefor. The presser bar 7 mounted in the overhanging arm 2, may be lifted by the usual hand lever 8, or by the usual lifting lever which is connected to a treadle or knee shift.

At the lower end of the presser bar 7 is a presser foot 9, which carries a folding scroll 10. Said folding scroll 10, as shown in Figs. 2 and 3, has a supporting plate 11, on which a body fabric may rest, with its edge extending into the scroll 12, so that the edge of the body fabric B will be turned underneath the same, as at 13, Fig. 14.

When it is desired to stitch a ruffled strip to a body fabric, said strip is inserted in the scroll 17 of the folder 14, which is carried by an arm 15, the body material is inserted in the folder 10, where its edge is turned over on top of the strip, as shown in Fig. 14, where the strip is indicated at C and the folded edge at $c'$. The downwardly projecting lip 18, carried by the scroll 17, aids in folding the edge and guiding the strip. Said lip 18, as shown in Fig. 1, is spaced from the parts of the folder directly underneath the same, so as to permit a free passage of the strip into the folder.

The arm 15 which carries the folder 17 is preferably pivoted to the work support, so that the folder may be swung around out of operation when desired.

In order that the strip which is to be stitched to the body fabric may be folded and ruffled in a continuous circle I have provided a ruffling mechanism which comprises a ruffling blade 19. Said ruffling blade 19 is positioned directly in front of the folder 14, and underneath the folded scroll 10, so that the ruffling blade will engage the folded edge of the strip C just as it leaves the folder 14. The spring-supporting plate or stripper 20 (see Figs. 1 and 12), is mounted on the work support, and the ruffling blade 19 operates on the material as it rests on the plate 20. The plate 20 provides a yielding surface, which is directly in front of the delivery end of the folder for the strip which is to be ruffled.

As a means for operating the ruffling blade 19, the head of the machine has a supporting bracket 21, which is equipped with bearings 22, 22, adapted to receive a supporting rod 23. The rod 23 is reciprocated back and forth in the bearings 22 by means of a lever 24, which is connected to the rod through the link 25. The lever 24 receives its oscillation from any suitable connection with the driving shaft of the machine, which connection is preferably provided with means whereby the stroke of the ruffling lever may be varied.

The supporting bar 23 carries a block 24$^a$ at its forward end, which block, as shown in Fig. 7 has a central opening to receive the rod 23. The block is secured on the supporting bar by suitable set screws 26. A swinging bracket 27 is pivoted at 28 to the block 24$^a$. A spring 29 mounted in the opening 30 and bearing at one end against an adjustable screw 31, engages the swinging bracket at its other end, and normally holds the forward end of the bracket thrown downward. In the lower face of the swinging bracket, I have formed a dovetailed groove 32, which receives a sliding plate 33. The ruffling blade 19 is rigidly secured to the plate 33 by suitable screws 34, (see Fig. 4). The sliding plate 33 has a cam slot 35.

The bracket 27 has a laterally projecting ledge 36, to which is pivoted a lever 37 by a pivot pin 38. The lever 37 carries a pin 39, which engages the cam slot 35 in the sliding plate 33. The lever 37 projects beyond the pivot pin 38 and carries a stud 40. A spring 41 is secured to the ledge 36, and bears against the stud 40, normally swinging the lever so as to hold the sliding plate 33 in the position shown in Fig. 3. When the sliding plate 33 carrying the ruffling blade 19 is in this position, the ruffling blade is then directly in front of the stitching point, and in lateral position for operating upon the material.

By swinging the lever 37 to the position shown in Fig. 9, the ruffling blade will be carried transversely of the line of feed to an inoperative or ineffective position, as shown in said figure. The spring 29 operating upon the swinging bracket 27 will normally hold the ruffling blade pressed against the material, so that as the rod 23 reciprocates back and forth in its bearings, the ruffling blade will be caused to yieldingly engage the fabric and ruffle or gather the same. As a means for holding the ruffling blade in inoperative position, and for lifting the same off from the fabric when it is moved to inoperative position, I have provided a swinging latch 42. The supporting rod 23 carries a bracket arm 43, which is clamped to the rod 23 by a screw 44$^a$. Said bracket arm 43 has a recess or a throat 44. The latch lever 42 is pivoted at 45 to the lower end of the arm 43. Said latch lever 42 has a laterally extending arm 46. A spring 47$^a$ is secured to the arm 43, and engages the upper end of the latch lever 42, normally holding said latch lever thrown in toward the rod 23 and the arm 46 thrown downward in the position shown in Figs. 5 and 8.

The swinging bracket 27 carries a projecting arm 47. This arm 47 when the ruffler is in normal operative position is located at a point near the forward end of the arm 46. When the ruffler is moved laterally to inoperative position through the lever 37 the arm 47 will engage the upper inclined face of the arm 46, and raise the ruffling blade off from the material, so that it may be readily withdrawn from its operative position. In Fig. 8 I have shown in dotted lines, the position of the rod 47 and the manner in which it slides up the inclined face of the arm 46. When the ruffling blade has been moved clear of the fabric, the swinging bracket 27 may be tilted against the action of the spring 29, so as to throw the arm 47 up into the throat 44 in the bracket arm 43. When this arm 47 is raised into the throat 44, the ruffling blade will then be raised, and the throat 44 will prevent lateral movement of the sliding plate 33 through the influence of the spring 41.

As a means for holding the arm 47 in the throat 44, I have provided the latch lever 42 with a swinging latch or dog 48, which is pivoted on the pivot pin 45, and normally pressed to the right with its shoulder 49 projecting in the path of the arm 47 by a spring 50. A tapered shoulder 51 carried by the latch or dog 48, limits the movement thereof. This latch 48 will yield to allow the arm 47 to be moved up into the throat 44, and then will swing outward so as to lock the arm in the throat and thus hold the ruffler blade in inoperative position.

In order that the ruffling blade may be thrown quickly into operative position, I have provided a releasing pin 52. Said releasing pin 52 lies normally above the latch lever 42, and is carried by a rock shaft 53 mounted in a bracket carried by the overhanging arm. The inner end of the rock shaft 53 carries a projecting member 54, which lies in the path of the shoulder at the upper end of the presser foot 9. If the presser bar is raised, said shoulder will engage the projecting member 54 just before the presser bar reaches the upper end of its stroke and swing the rock shaft 53, thus depressing the releasing pin 52. The upper face of the latch-lever 42 is inclined to the vertical, so that as the pin 52 engages the same, it will gradually crowd the latch lever to the left to the position shown in Fig. 11. As the latch lever moves to the left, the locking dog or latch 48 will be carried therewith and move out of the path of the projecting arm 47, allowing the same to be moved downward through the influence of the spring 29, and laterally through the influence of the spring 41, thus carrying the ruffling blade into operative position relative to the stitching mechanism. When the lever 42 is moved to the left, the arm 46 is raised. The swinging bracket 27 has a second arm 55, which is in a plane slightly lower than the projecting arm 47. When the swinging bracket is released, the arm 55 will strike against the arm 46, which is now in substantially a horizontal position, as shown in Fig. 11, and prevent the swinging bracket from further movement about its axis 28. The presser foot is now raised by reason of the fact that the latch lever is not operated until the presser foot reaches substantially its upper position. The sliding plate 33 will, however, move laterally, carrying the ruffler blade across the line of feed in position to be lowered on to the fabric. As soon as the presser foot lifting mechanism is released, the presser foot is lowered on to the work, and at the same time the latch lever 42 is released from the action of the releasing pin 52, which allows the arm 46 to swing downward and the ruffler blade to be lowered on to the material.

It will thus be seen that I have provided means for holding the ruffling blade lifted from the material until it is moved laterally to the proper position over the material for operation upon the same.

My improved ruffling mechanism is especially adapted for stitching a ruffled strip on to the lower portion of a skirt. The body of the skirt is passed through the folder 10, and its lower edge folded. The strip to be stitched to the skirt is passed through the folder 14, and its edge is folded. The ruffler operates upon the strip only and ruffles or gathers the same as it is stitched to the body of the skirt. After having practically completed the stitching of the strip on to the body of the skirt, the ruffler must be removed, to get out of the line of the seam in order that the completing of the continuous line of stitching may occur. The operator may quickly manipulate the lever 37, moving the ruffling blade laterally to inoperative position, and by merely tilting the swinging bracket, lock the ruffling blade in this inoperative position. The finishing of the stitching of the strip to the body of the skirt, may then be performed. When it is desired to bring the ruffling blade into operative position, all that is necessary is for the operator to lift the pressure foot by means of the usual knee shift or treadle, and the lifting of the presser foot releases the latch which holds the ruffling mechanism in inoperative position, and the same is at once automatically returned to ruffling position. The lower folder 14 has a forwardly projecting guiding plate 17ª, which operates to guide the folded edge until after it is operated upon by the ruffler blade.

It will be seen that I have mounted my ruffling mechanism so that the same may be moved underneath the overhanging arm of the machine when it is moved to inoperative position. By this arrangement of parts my ruffling mechanism is especially adapted for the purpose above described, for the reason that the strip to be ruffled may be passed underneath the overhanging arm, and the body of the skirt positioned at the other side of the stitching mechanism, where there is sufficient room for the manipulation of the skirt.

It is sometimes desirable to stitch a ruffled strip or a flounce on to a body material at a distance from its edge, and in order that this result may be accomplished on my machine, a folder 56 is secured to an arm 57 pivoted to the head of the machine, as shown in Figs. 1, 2 and 15. The presser foot shown in Fig. 1, carrying a folding scroll is removed, and an ordinary presser foot 58 used in place thereof. The folder 14 is swung out of operative position. The folder 56 is located in the rear of the ruffling blade 19, and the strip to be ruffled is passed through the folder 56. The body of the goods passes underneath a stripper blade 59 carried by the lower end of the arm 57. The ruffler operates upon the strip as it rests upon the stripper blade 59, and, therefore, the strip only will be ruffled. There is a free space underneath the stripper blade, for the body of the goods; therefore the strip may be stitched at any desired point to the body of the goods.

A swinging latch 60 carried by the head of the machine and controlled by a spring 61, holds the arm 57 in its raised position. A lug 62 carried by the arm 57 engages an adjustable stop 63 and holds the arm in its lower position. The weight of the arm 57 and the parts carried thereby moves the arm into operative position and in engagement with the stop lug 62.

It will be noted that the ruffling or gathering blade is moved laterally on the reciprocating head, and, therefore, when this gathering blade is moved either to operative or inoperative position, comparatively few parts are shifted and the shift may be easily and quickly accomplished. When the gathering blade is moved laterally, it is brought out of engagement with the material, and is, therefore, rendered inoperative to gather or ruffle the material. It will be understood that by this term "inoperative", I do not refer to the movements of the gathering blade, for when out of engagement with the fabric, the ruffling blade may or may not be reciprocated, but said term is used as descriptive of the ineffective action of the gathering blade when it is moved out of contact with the material.

While the mechanism for throwing the ruffling blade into operative position is tripped by the lifting of the presser foot, it should be understood that this tripping is brought about by lifting the foot to its extreme upper position, and that the foot may be raised slightly by means of the hand or knee lever, so as to insert the work, without releasing the tripping mechanism. When the ruffler mechanism is moved laterally by means of the hand lever to ineffective position, the lever 42 will serve as a stop to prevent the ruffler blade from being moved too far, and as it is tilted the arm 43 will serve as a stop to limit the upward tilting movement of the blade. The ruffler blade, as shown in Fig. 13, is provided with a lateral extension 19ª which extends in front of the holder.

While I have described the ruffling blade as reciprocating back and forth in a straight line, it will be understood that I do not intend by the term "reciprocating" to be limited to a right line movement, but that said blade may be carried by an oscillating part or in any other way moved back and forth.

Having thus described my invention, what I claim as new and desire to secure by Letters Patent, is:—

1. A gathering mechanism for sewing machines including a gathering blade, a reciprocating member carrying said gathering blade, and manually operated devices for moving said gathering blade transversely of said reciprocating member, whereby the same may be rendered operative or inoperative.

2. A gathering mechanism for sewing machines including a gathering blade, a reciprocating member carrying said gathering blade, manually operated devices for moving said blade transversely of said reciprocating member, and means for holding said blade in inoperative position.

3. A gathering mechanism for sewing machines including a gathering blade, a reciprocating member carrying said gathering blade, means for moving said blade transversely of said reciprocating member, means for holding said blade in inoperative position, and automatic means for returning said gathering blade to operative position when released from its holding means.

4. A gathering mechanism for sewing machines including a gathering blade, a reciprocating member carrying said gathering blade, means for moving said gathering blade transversely of said reciprocating member, a latch for holding said gathering blade in inoperative position, and a spring for returning said gathering blade to operative position when released from said latch.

5. A gathering mechanism for sewing machines, including a reciprocating member, a bar slidingly supported on said reciprocating member, so that it may be moved transversely of said reciprocating member, a gathering blade carried by said sliding bar, and manually operated devices for moving said sliding bar on said reciprocating member.

6. A gathering mechanism for sewing machines including a reciprocating member, a bar slidingly supported on said reciprocating member so that the same may move laterally thereof, a gathering blade carried by said sliding bar, and a lever for moving said sliding bar on said reciprocating member.

7. A gathering mechanism for sewing machines including a reciprocating member, a bar slidingly supported on said reciprocating member so that the same may move laterally thereof, a gathering blade carried by said sliding bar, a lever for moving said sliding bar on said reciprocating member, and a spring for normally holding said gathering blade in operative position.

8. A gathering mechanism for sewing machines including a reciprocating member, a bar slidingly supported on said reciprocating member so that the same may move laterally thereof, a gathering blade carried by said sliding bar, a lever for moving said sliding bar on said reciprocating member, a spring for normally holding said gathering blade in operative position, an arm carried by said sliding bar, and means coöperating with said arm for holding the gathering blade in inoperative position.

9. A gathering mechanism for sewing machines including a gathering blade, a reciprocating bar, a bracket pivoted to said reciprocating bar, means slidingly connected with said bracket for supporting said gathering blade, and means for moving said gathering blade transversely relative to said bracket and for tilting said bracket to render said gathering blade inoperative.

10. A gathering mechanism for sewing machines including a gathering blade, a reciprocating bar, a bracket pivoted to said reciprocating bar, means slidingly connected with said bracket for supporting said gathering blade, means for moving said gathering blade laterally transversely to said bracket and for tilting said bracket to render said gathering blade inoperative, and means for holding said gathering blade in inoperative position.

11. A gathering mechanism for sewing machines including a gathering blade, a reciprocating bar, a bracket pivoted to said reciprocating bar, means slidingly connected with said bracket for supporting said gathering blade, means for moving said gathering blade laterally relative to said bracket and for tilting said bracket to render said gathering blade inoperative, a spring normally holding said gathering blade in operative position, a latch for holding said gathering blade in inoperative position, and means for releasing said latch.

12. A gathering mechanism for sewing machines including a gathering blade, a reciprocating member, a bracket pivoted to said reciprocating member, a sliding bar carried by said bracket and supporting said gathering blade, a lever carried by said bracket for moving said sliding bar thereon, a spring normally holding said sliding bar with the gathering blade in operative position, and a latch for holding the gathering blade in inoperative position.

13. A gathering mechanism for sewing machines including a gathering blade, a reciprocating member, a bracket pivoted to said reciprocating member, a sliding bar carried by said bracket and supporting said gathering blade, a lever carried by said bracket for moving said sliding bar thereon, a spring normally holding said sliding bar with the gathering blade in operative position, an arm carried by said sliding bar, and means coöperating with said arm for holding the gathering blade in inoperative position.

14. A gathering mechanism for sewing machines including a gathering blade, a reciprocating member, a bracket pivoted to said reciprocating member, a sliding bar carried by said bracket and supporting said gathering blade, a lever carried by said bracket for moving said sliding bar thereon, a spring normally holding said sliding bar with the gathering blade in operative position, an arm carried by said sliding bar, a second arm having a throat for receiving the arm carried by said sliding bar when the gathering blade is in inoperative position, and a latch for holding said last named arm in said throat.

15. A gathering mechanism for sewing machines including a work support, a gathering blade, manually controlled means for moving the same laterally and away from the work support, a latch for holding said gathering blade in inoperative position, and automatic means operating upon the releasing of said latch for moving the ruffling blade laterally and subsequently lowering the same into operative position.

16. A gathering mechanism for sewing machines including a gathering blade, a reciprocating member, a bracket pivoted to said reciprocating member, a sliding bar carried by said bracket and supporting said gathering member, an arm carried by said reciprocating member, an arm carried by said sliding bar, an inclined member carried by the first named arm and coöperating with the arm carried by said sliding bar, so that when said gathering member moves laterally, said bracket will be tilted.

17. A gathering mechanism for sewing machines including a gathering blade, a reciprocating member, a pivoted bracket carried by said reciprocating member, means slidingly carried by said bracket for supporting the gathering member, means for sliding said gathering blade laterally on said bracket and for tilting said bracket, whereby said gathering member is moved to inoperative position, means for holding said gathering member in inoperative position, means for returning said gathering member to operative position when released from its holding means, and means for preventing said bracket from swinging on its pivot to bring the gathering blade into engagement with the fabric until the gathering blade has moved laterally on said bracket to operative position.

18. A gathering mechanism for sewing machines including a gathering blade, a reciprocating member, a pivoted bracket carried by said reciprocating member, means slidingly carried by said bracket for supporting the gathering member, means for sliding said gathering blade laterally on said bracket and for tilting said bracket, whereby said gathering member is moved to inoperative position, means for holding said gathering member in inoperative position, means for returning said gathering member to operative position when released from its holding means, an arm carried by said pivoted bracket, and means coöperating therewith for holding said bracket from swinging on its pivot until after the gathering member has returned to operative position.

19. A sewing machine including in combination, stitch-forming mechanism, a presser foot, means for lifting said presser foot, a gathering mechanism comprising a gathering blade, a reciprocating member carrying said gathering blade, means for moving said gathering blade laterally relative to said reciprocating member to inoperative position, a latch for holding said gathering blade in inoperative position, and means for releasing said latch upon the lifting of the presser foot.

20. A sewing machine including in combination, stitch-forming mechanism, a presser foot, means for lifting the presser foot, a gathering mechanism comprising a gathering blade, a reciprocating member, a pivoted bracket carried by the reciprocating member, a sliding member carried by said bracket and supporting said gathering blade, means for moving said sliding member laterally and for tilting the bracket so as to render the gathering blade inoperative, a latch for holding the gathering blade in inoperative position, means for returning the gathering blade to operative position, and means controlled by the presser foot lifting mechanism for preventing the swinging movement of the bracket after the latch is released until the sliding member has moved the gathering blade to operative position.

21. A sewing machine including in combination, stitch-forming mechanism, a folder for folding underneath the edge of a fabric, a second folder for guiding and folding an edge of a fabric, a gathering member operating upon second named fabric between said folders, and manually operated means for moving said gathering member transversely of its line of reciprocation to withdraw the same from between the folded fabrics for rendering the gathering blade inoperative.

22. A sewing machine including in combination, a work supporting, an overhanging arm, stitch-forming mechanism, a presser foot, a folder constructed to fold the edge of a fabric carried by said presser foot, a second folder located in front of said presser foot, a gathering mechanism comprising a gathering blade operating upon a fabric between said folders, and manually operated means for moving said gathering blade laterally in a direction underneath the overhanging arm for rendering the same inoperative.

23. A gathering mechanism including in combination, a gathering blade, a reciprocating member, a sliding member carried by said reciprocating member for supporting the gathering blade, means for holding said gathering blade in inoperative position including an arm having a throat, a swinging latch, and a yielding dog carried by said latch and normally extending into said throat.

24. A gathering mechanism including in combination, a gathering blade, a reciprocating member, a sliding member carried by said reciprocating member for supporting the gathering blade, means for holding said gathering blade in inoperative position including an arm having a throat, a swinging latch, and a yielding dog carried by said latch and normally extending into said throat, means for releasing said latch including a rock shaft carrying a releasing pin, and means for oscillating said rock shaft.

25. A sewing machine including in combination a presser foot, means for lifting said presser foot, a gathering mechanism including a gathering blade, means for reciprocating said blade, means for moving the gathering blade transversely of its direction of reciprocation to inoperative position, a latch for holding the gathering blade in its inoperative position, means for releasing said latch including a rock shaft, a releasing pin carried thereby, and means for oscillating said rock shaft by the lifting of the presser foot.

26. A gathering mechanism for sewing machines including a gathering blade, means for operating said gathering blade, means for moving said gathering blade laterally and vertically to an ineffective position, means for returning said blade to effective position, and means for holding said blade in ineffective position, including a tripping device.

27. A gathering mechanism for sewing machines including a gathering blade, means for operating said gathering blade, and means for moving said gathering blade transversely of its direction of reciprocation to render the same ineffective, automatic means for moving said gathering blade to effective position, and means for holding the gathering blade in ineffective position including a tripping device.

28. In a gathering mechanism for sewing machines, including a gathering blade, means for reciprocating the same, means to give said blade a lateral and a swinging movement in one direction to render the same ineffective, and automatic means to give said blade a lateral and a swinging movement in the other direction to render the same effective.

29. A sewing machine including in combination, stitch-forming mechanism, a presser foot, means for moving said presser foot vertically, a gathering mechanism comprising a gathering blade, means for moving said gathering blade transversely relative to said presser foot to inoperative position, automatic means operable as said presser foot is moved vertically to restore said gathering blade to operative position.

30. In a sewing machine, in combination, stitch-forming mechanism, a presser foot, a gathering mechanism including a gathering blade, means to move said gathering blade transversely relative to said presser foot to inoperative position, means to raise said presser foot vertically, and means whereby in the further movement of said presser foot, the gathering blade will be restored to operative position relative to said presser foot.

31. In a sewing machine including in combination, stitch-forming mechanism, a work support, a stripper blade mounted upon said work support, a folding device mounted in a horizontal plane above said stripper blade, a second folding device mounted above said work support, a gathering blade, and means to operate said gathering blade in a space between the two folding devices and in a path above the stripper blade.

32. In a sewing machine including in combination, stitch-forming mechanism, a work support, a needle, a stripper blade, a folding device arranged in advance of and in line with said needle and having means whereby it can be moved out of operative position, a second folding device arranged in advance and in line with said needle, a gathering device and means to operate it, said gathering device having means to move it laterally relative to said needle, whereby circular seams can be joined at the starting and finishing point.

33. In a sewing machine in combination, stitch-forming mechanism, a work support, a needle, a stripper blade, a folding device arranged in advance of and in line with said needle, and having means whereby it can be moved out of operative position, a second folding device arranged in advance of and in line with said needle, a gathering device, and means to operate it, said gathering device having automatic means to move it laterally relative to said needle, whereby circular seams can be joined at the starting and finishing point.

34. In a sewing machine, in combination, stitch-forming mechanism, a work support, a needle, a stripper blade mounted upon the work support and having a portion projecting above the work support, a folding device arranged in advance of and in line with said needle, a second folding device arranged in advance of and in line with said needle, a gathering device, and means for operating said gathering device, whereby the same coöperates with the portion of the stripper blade extending above the work support, and means for moving the gathering device transversely to an ineffective position.

35. In a sewing machine in combination, stitch-forming mechanism, a work support, a needle, a plurality of folding devices, one of said folding devices being movable vertically from said work support, a stripper blade, means for supporting said stripper blade, a gathering device, means to operate it, means to move it laterally relative to said needle, and means as said lateral movement toward the needle takes place, to move it in a direction toward the work support.

36. In a sewing machine including stitch-forming mechanism, a gathering device, a supporting member for said gathering device, means for operating said support, means for moving said gathering blade transversely of said support and out of the line of the seam and also vertically, stops for said gathering blade to limit its vertical and lateral movements.

37. In a sewing machine including stitch-forming mechanism, a gathering device, a supporting member for said gathering device, means for operating said support, means for moving said gathering device transversely of said support and out of the line of the seam, and also to give it a swinging movement, and stops for said gathering blade to limit its said lateral and swinging movements.

38. In a sewing machine in combination, stitch-forming mechanism, a work plate, a gathering blade held at an angle to said work plate, and means to operate it, a folding device, said folding device having its upper portion formed with a downward extension and a guide attached to one side of its delivery end.

39. In a sewing machine the combination of a stitch-forming mechanism, a plurality of folding devices, arranged in advance of the stitch-forming mechanism, the delivery ends of said folding devices being spaced from one another, a gathering blade for engaging the material between the delivery ends of said folders, a reciprocating member carrying said gathering blade, and manually operated means for moving said gathering blade transversely of said reciprocating member, whereby the same may be rendered operative or inoperative.

40. In a sewing machine the combination of a stitch-forming mechanism, a plurality of folding devices, arranged in advance of the stitch-forming mechanism, the delivery ends of said folding devices being spaced from one another, a gathering blade for engaging the material between the delivery ends of said folders, a reciprocating member carrying said gathering blade, and manually operated means for moving said gathering blade transversely of said reciprocating member, whereby the same may be rendered operative or inoperative, said gathering blade having a lateral extension projecting in front of one of said folding devices.

In testimony whereof I affix my signature in presence of two witnesses.

JAMES R. MOFFATT.

Witnesses:
C. McNeil,
A. C. Abel.

Copies of this patent may be obtained for five cents each, by addressing the "Commissioner of Patents, Washington, D. C."